United States Patent Office 3,508,321
Patented Apr. 28, 1970

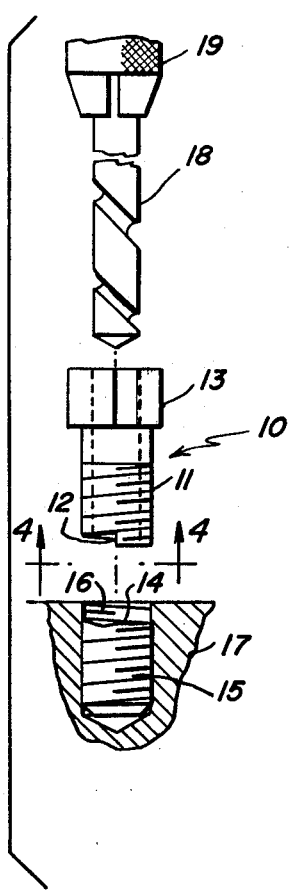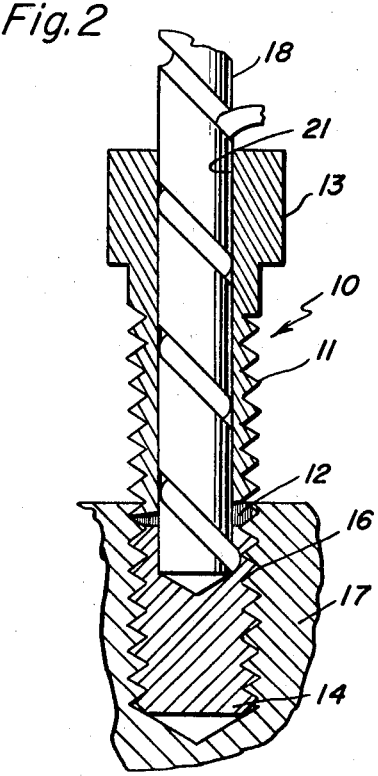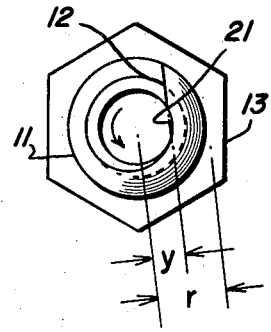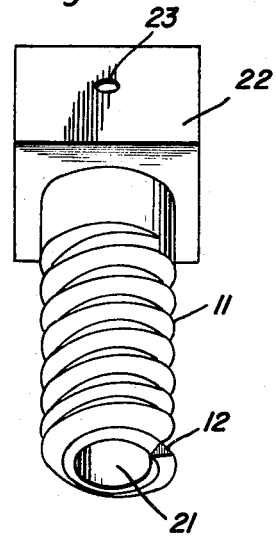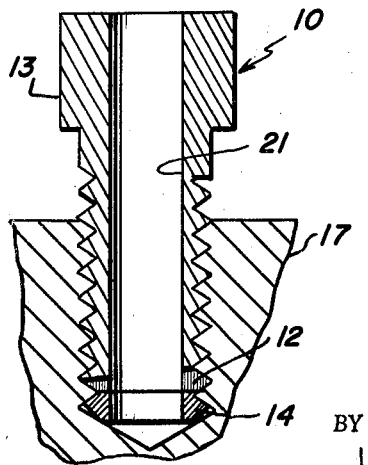

---

3,508,321
METHOD FOR EXTRACTING BROKEN STUDS
William M. Wood, Delray Beach, Fla., assignor to A & W Enterprises, Incorporated, Delray Beach, Fla., a corporation of Florida
Filed Dec. 15, 1967, Ser. No. 690,859
Int. Cl. B23p 19/02
U.S. Cl. 29—427                    3 Claims

ABSTRACT OF THE DISCLOSURE

A broken stud extracting method for the removal of broken studs, bolts, screws, or the like, having an elongated body with external threads terminating in a cutting edge on one end of the body. A gripping head, such as a hexagonal head, may be rotated with a wrench, or the like, and a bore extending the length of the body is used to guide a drill bit in removing the center portion of the broken stud, or the like utilizing an extractor. The extractor is adapted to remove the threaded sleeve remaining after drilling the stud center by rotating the extractor external threads in the internal threads engaging the broken stud threads causing the cutting edge to gouge out the stud threads.

BACKGROUND OF THE INVENTION

Field of the invention

The present invention relates to a broken stud extractor and more particularly to an apparatus and method for removing broken screws, studs, taps, bolts, and the like.

The present extractor has an elongated body with a bore or hole running through the length of the body for inserting a drill bit through said bore. One end portion of the body is externally threaded with the thread terminating in a cutting edge on one end of the body, while the other end portion has a gripping surface, such as a hexagonal surface, located between the ends of the body for gripping the body, such as with a wrench for rotating said body. The bore passing through the body is adapted to guide a drill bit for drilling in a broken stud, or the like, to form a thin-walled threaded sleeve from the broken stud. The body is also adapted to remove the threaded sleeve from its engaging internal threads by rotating the body's external threads in said internal threads. My invention advantageously allows the old stud to be drilled out with a high degree of accuracy so that the old stud may be drilled very close to the threads without damaging the threads. It also allows fast removal of broken studs without damage to the engaging external threads.

Description of the prior art

In the past broken studs, screws, taps, and the like, have been removed in a number of ways, one of the most common being to mark the exact center of the broken stud with a center punch, drill out as much of the stud as possible, and then rethread the drilled hole using a tap and tap wrench. This method, however, tends to cut new threads over the old threads, and thus providing weaker new threads. It is also time consuming and very difficult to drill a hole down the broken stud.

Another way used to remove a broken stud is by drilling a short distance into the broken stud and then wedging a diamond point chisel, or the like, into the hole and attempting to rotate the chisel with a wrench to unscrew the stud. A similar method requires drilling out the stud, inserting a "screw retractor" which is a tool much like a corkscrew which grips the sides of the drilled hole. A wrench is then used to twist the extractor to remove the broken stud. These methods tend to wedge the broken studs in tighter, in addition to the problems of accurately drilling out the broken stud without damaging the internal threads engaging the stud threads. Similarly, the drilled stud could be collapsed for removal but this risks damage to the internal thread during drilling as well as during collapsing.

In addition to the above methods, broken taps may be removed with a broken tap remover which merely has fingers for inserting along the flutes of the broken tap. A wrench is then used to rotate the extractor for removing the tap. Taps may also be removed by inserting a chisel or a punch in one of the broken tap flutes and striking the chisel light blows with a hammer. These methods are, of course, available only for use with broken taps and not with studs, bolts, screws, or the like.

Finally, it has been suggested to use a cylinder head as guide for a drill bit to drill out a broken stud on a gas engine. A small piece of pipe is inserted in the stud hole of the cylinder head of the broken stud to keep the drill off the internal threads of the engine blocks. While this method improves the accuracy of the drill bit in removing the center of the old stud, it is time consuming in that the cylinder head must be removed and replaced several times and on drilling a fairly deep hole, the accuracy still suffers in proportion to the distance from the guide. Also, it is limited to gas engines.

BRIEF DESCRIPTION OF THE DRAWINGS

Other objects, features, and advantages of this invention will be apparent from a study of the written description and the drawings in which:

FIGURE 1 is an exploded view of the present invention, the broken stud, and drill;

FIGURE 2 shows a cutaway of the embodiment of FIGURE 1 upon starting the removal operation;

FIGURE 3 shows a cutaway of the present invention upon completion of the stud removal;

FIGURE 4 shows an end view of the invention taken along line 4—4 of FIGURE 1; and FIGURE 5 illustrates a perspective view of the invention.

DESCRIPTION OF THE PREFERRED EMBODIMENT

Referring to FIGURE 1 an embodiment of the present stud extractor is seen at 10 having an elongated body with external threads 11 which terminate at one end in a gouging point or cutting edge 12. The extractor 10 has a gripping surface 13 shown as a hexagonal head which can be conveniently gripped by a wrench for rotating said extractor 10.

A broken stud 14 has external threads 15 is shown engaging internal threads 16 of a structure 17. It should be noted that the broken stud is broken so as to leave some of the internal threads 16 free from the stud 14 external threads 15. This will frequently be the case and is convenient for starting the extractor 10 threads 11 in the internal threads 16. If none of the threads 16 are left exposed, a chisel, or the like, may be used to break off a sufficient amount of the stud 14 to allow the extractor 10 threads 11 to engage the threads 16.

A drill 18 is shown in FIGURE 1 placed in the chuck 19 of a drill (not shown). The drill is inserted through the extractor as will be explained in more detail with respect to FIGURE 2.

Turning now to FIGURE 2, there can be seen a cut-a-way view of extractor 10 engaged in the first thread of threads 16. Drill bit 18 has been inserted through bore 21 which bore extends the length of the extractor 10 and acts as a guide for drill bit 18. The bore 21 prevents the drill bit 18 from damaging the internal threads 16 of structure 17 as it drills out broken stud 14. As stud 14 is drilled out, there will remain a thin walled, threaded sleeve engaging internal threads 16. Extractor 10 may then be gripped with a wrench, or the like, on gripping surface 13 and rotated. As extractor 10 revolves, the cutting edge 12 will remove the remaining portion of the stud 14. In normal operation, a small distance will be drilled into stud 14, then extractor 10 will be rotated into structure 17 a short distance, then the drill will be used to drill out another short distance into stud 14, and so on, until stud 14 has been completely removed. By being able to drill intermittently for short distances, the accuracy of the drilling of the broken stud is greatly improved, thus preventing damage to internal threads 16 while being able to remove the center of stud 14 very close to the threads 16.

FIGURE 3 shows the extractor 10 just before it reaches the end of stud 14. Bore 21 can be more clearly viewed with the drill bit removed and cutting edge 12 can also be seen. In this view, all that remains is to rotate extractor 10 a short distance with a wrench gripping surface 13 until the remainder of stud 14, which has already been drilled out, is removed.

FIGURE 4 shows an end view of an embodiment in which the gripping surface 13 may be seen and threads 11 terminate in cutting edge 12. The shape of cutting edge 12 must be such that it will follow the shape of the internal threads 16 with its end surface shaped for efficient removal of the stud 14 threads 15. One preferred location of the cutting edge may be ½ the radius of the outside diameter or O.D. of the thread 11 from the axis of the elongated body and generally perpendicular thereto. This is indicated by Y in FIGURE 4 where it can be seen that $Y=\frac{1}{2}r$. Also indicated is the direction of rotation by an arrow which of course will depend upon whether a right hand or left hand thread is being removed and would require different extractors. It should also be recognized that a different extractor is required for each type of thread as well as size and fit of the threads.

Referring now to FIGURE 5, a perspective of an embodiment of the present invention having a square gripping surface 22 and also a hole 23 which may extend through the gripping surface or may be threaded. The square surface may be used with different types of wrenches and the hole may be used for the insertion of a rod or handle when a wrench is not available. Screw-in handles or even built-in handles could also be used. External threads 11 may be seen terminating in cutting edge 12 and also bore 21 is visible at one end.

From the foregoing description it will be clear that a broken stud, bolt, screw, or the like extractor has been described. The extractor as described may be used to remove a wide range of threaded devices that have broken off without damaging the internal threads engaging the threads of the broken piece being removed. While several variations have been described it is to be understood that other variations are contemplated as being within the spirit and scope of the invention.

This invention is not to be construed as limited to the particular forms disclosed herein, since these are to be regarded as illustrative rather than restrictive.

I claim:
1. A method for removing broken studs, screws, taps, bolts, and the like, comprising the steps of:
   (a) engaging a threaded stud extractor having a cutting edge thereon with the internal threads of an object having a broken stud, or the like, therein;
   (b) inserting a drill bit through a bore passing through said stud extractor;
   (c) drilling along the longitudinal axis of said broken stud whereby a threaded sleeve is formed of a portion of said broken stud; and
   (d) rotating said stud extractor and the cutting edge thereon to remove said threaded sleeve.
2. The method, according to claim 1, in which said steps of drilling and rotating includes intermittent drilling of said broken stud and rotating of said stud extractor, thereby removing said broken stud in increments.
3. The method in accordance with claim 1, but including the step of breaking loose a portion of said broken stud to expose sufficient internal threads of said object for engaging said threaded stud extractor with said internal threads of said object.

References Cited

UNITED STATES PATENTS

| 1,785,847 | 12/1930 | Valentine | 29—427 |
|-----------|---------|-----------|--------|
| 2,121,197 | 6/1938 | Jackman | 29—427 |
| 2,391,405 | 12/1945 | Fuglie | 29—426 |
| 2,408,450 | 10/1946 | Schrader | 29—427 |
| 2,684,606 | 7/1954 | Brawley | 29—426 |
| 2,694,328 | 11/1954 | La Freniere | 29—426 |
| 2,752,671 | 7/1956 | Alyea | 29—426 |
| 501,941 | 7/1893 | Higbee | 85—1 |
| 1,153,488 | 9/1915 | Hallowell | 10—10 |
| 2,024,593 | 12/1935 | Moore | 10—27 |
| 2,140,467 | 12/1938 | Cargile | 85—47 |
| 3,238,836 | 3/1966 | Johnson | 85—47 |
| 2,281,164 | 4/1942 | Maling | 29—426 |
| 2,744,312 | 5/1956 | Conger | 29—426 |

FOREIGN PATENTS 1,035,663  7/1966  Great Britain.

CHARLES W. LANHAM, Primary Examiner

E. M. COMBS, Assistant Examiner